(12) United States Patent
Weinberg et al.

(10) Patent No.: US 11,997,478 B2
(45) Date of Patent: May 28, 2024

(54) SYSTEM AND METHOD FOR SECURING ELECTRONIC MESSAGE

(71) Applicant: FirstPoint Mobile Guard Ltd., Gealya (IL)

(72) Inventors: Adam Weinberg, Netanya (IL); Dror Fixler, Ganei-Tikva, IL (US); Frank Kleinewoerdemann, Givatayim (IL)

(73) Assignee: FIRSTPOINT MOBILE GUARD LTD., Gealya (IL)

( * ) Notice: Subject to any disclaimer, the term of this patent is extended or adjusted under 35 U.S.C. 154(b) by 364 days.

(21) Appl. No.: 17/097,540

(22) Filed: Nov. 13, 2020

(65) Prior Publication Data
US 2021/0153011 A1    May 20, 2021

Related U.S. Application Data

(60) Provisional application No. 62/935,176, filed on Nov. 14, 2019.

(51) Int. Cl.
H04W 16/24        (2009.01)
H04W 4/14         (2009.01)
(Continued)

(52) U.S. Cl.
CPC .......... *H04W 12/033* (2021.01); *H04W 4/14* (2013.01); *H04W 12/06* (2013.01);
(Continued)

(58) Field of Classification Search
CPC ..... H04W 12/033; H04W 4/14; H04W 12/06; H04W 12/106; H04W 12/43;
(Continued)

(56) References Cited

U.S. PATENT DOCUMENTS

| 8,837,739 B1* | 9/2014 | Sexton ................. H04L 9/0825 380/278 |
| 2009/0257593 A1* | 10/2009 | Losovsky ........... H04L 63/0464 380/259 |
| 2020/0067861 A1* | 2/2020 | Leddy ................. G06F 21/6245 |

FOREIGN PATENT DOCUMENTS

| WO | 2012131659 A1 | 10/2012 |
| WO | WO-2012131659 A1 * | 10/2012 ........... G06Q 20/385 |

OTHER PUBLICATIONS

Omego Obinna; Eckhard Pfluegel; Martin J. Tunnicliffe; Charles A. Clarke; "Ensuring Message Freshness in A Multi-Channel SMS Steganographic Banking Protocol"; 2018 International Conference Paper on Cyber Security and Protection of Digital Services (Cyber Security); IEEE; pp. 1-7 (Year: 2018).*

* cited by examiner

*Primary Examiner* — Fatoumata Traore
*Assistant Examiner* — Courtney D Fields
(74) *Attorney, Agent, or Firm* — BROWDY AND NEIMARK, P.L.L.C.

(57) ABSTRACT

The present invention disclose a system for securing transmission of electronic message, said system comprising:
  at least one non-transitory computer readable storage device and one or more processors operatively coupled to the storage device on which are stored modules of instruction code which when executed by said one or more processors implements messages Security Proxy and message security (SMS) router for identifying message based on sender address;
  wherein said messages Security Proxy monitor communication to cellular mobile devices through subscriber serving node through message router, using HLR or HSS service
  wherein said Security Proxy is configured buffering the messages and verify authenticity of the Message recipient, (Continued)

incase authenticated send messages and otherwise blocking the message.

9 Claims, 14 Drawing Sheets

(51) Int. Cl.
    *H04W 12/033*     (2021.01)
    *H04W 12/06*     (2021.01)
    *H04W 12/106*     (2021.01)
    *H04W 12/43*     (2021.01)
    *H04W 28/02*     (2009.01)
    *H04W 48/04*     (2009.01)
    *H04W 72/12*     (2023.01)

(52) U.S. Cl.
    CPC ......... *H04W 12/106* (2021.01); *H04W 12/43* (2021.01); *H04W 48/04* (2013.01)

(58) Field of Classification Search
    CPC ............... H04W 48/04; H04L 63/0428; H04L 63/0884; H04L 63/1408; H04L 63/0853
    See application file for complete search history.

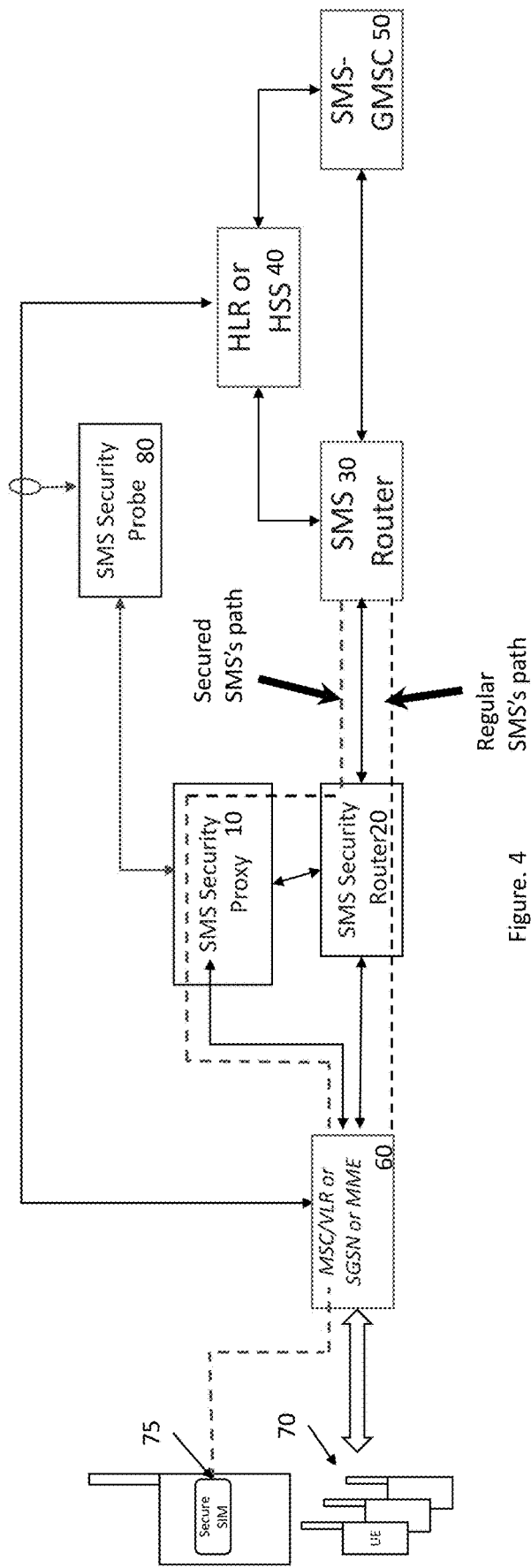

SYSTEM AND METHOD FOR SECURING ELECTRONIC MESSAGE

FIELD OF THE INVENTION

The present invention generally relates to the field of electronic messages security. More specifically.

The present invention addresses issues associated with monitoring electronic messages and verifying the authenticity of messages and their destination.

SUMMARY OF THE INVENTION

The present invention provides a system for securing transmission of electronic message, said system comprising:
- at least one non-transitory computer readable storage device and one or more processors operatively coupled to the storage device on which are stored modules of instruction code which when executed by said one or more processors implements messages Security Proxy and message security (SMS) router for identifying message based on sender address;
- wherein said messages Security Proxy monitors communication to cellular mobile devices through subscriber serving node;
- wherein said Security Proxy is configured to buffer the messages and verify authenticity of the message recipient;
- in case the message recipient is authenticated send messages, otherwise block the message.

According to some embodiments of the present invention the system further comprising a SMS Security Router, for creating secured message path between the message router and the subscriber serving node.

According to some embodiments of the present invention the message is authenticated by Identifying a source or sender address based on a list of addresses, registered to the service.

According to some embodiments of the present invention the Security router is configured to identify message based on sender address, wherein the security proxy handless only senders registered to the service.

According to some embodiments of the present invention the message is authenticated by checking the subscriber serving node originality or the cellular site of the subscriber serving node.

According to some embodiments of the present invention the message is authenticated by verifying the authenticity of the destination.

According to some embodiments of the present invention the system further comprising a secured SIM at the cellular device which enables authenticating and securing the message destination.

According to some embodiments of the present invention the message is authenticated by checking subscriber serving node behavior by sending test message, wherein in case of no response or incorrect response the subscriber serving node is identified as fake.

According to some embodiments of the present invention the message is authenticated by filtering relevant text messages (SMSs) based on the information in each of the messages, According to some embodiments of the present invention, wherein the authenticity of the destination subscriber serving node is challenged by sending a challenge signaling message which requires response, by the SMS security proxy, wherein if the subscriber serving node does respond correctly, proceeding with sending the buffered original text messages, otherwise, blocking the messages.

According to some embodiments of the present invention the system further comprising a security probe configured to analyze parameters and characteristics of the monitored communication in real time or in relation to historically acquired data, including at least one of communication with subscriber serving node properties or the behavior of destination address or source address.

According to some embodiments of the present invention the security probe is configured to detect suspicious scenarios to identify illegitimate location of mobile device by detecting location update which is inconsistent with timing of previous location.

According to some embodiments of the present invention the security probe is configured to check a blacklist of destination addresses/identity.

According to some embodiments of the present invention the security probe is configured to check the subscriber serving node originality by checking the cellular site of the subscriber serving node.

According to some embodiments of the present invention the security probe is configured check the subscriber serving node behavior by sending a test message, wherein in case of no response or incorrect response, the subscriber serving node is identified as fake.

According to some embodiments of the present invention the comprising a secured SIM 80 at the cellular device which enables authenticating and securing the message destination by securing a SIM to respond using cryptographic crafted message.

According to some embodiments of the present invention the HSS/HLS and Security router are configured to identify and filter message based on destined recipient address, wherein the security proxy handless only messages having destined recipient registered to the service.

The present invention provides a system for securing transmission of electronic message, said system comprising:
- at least one non-transitory computer readable storage device and one or more processors operatively coupled to the storage device on which are stored modules of instruction code which when executed by said one or more processors implements an encrypt broker which enable using password wherein the encrypt broker encrypts the SMS messages using encryption key created by the SMS source and sends the encrypted message to a designated user app for decryption.

According to some embodiments of the present invention the system further comprising a secure SIM, configure to decrypt the message and sending password to user, wherein the message is received at SMS App and sent to secure SIM.

According to some embodiments of the present invention the system further comprising a secure SIM, configured to receive personal message directly at the secure SIM and to decrypt the message and sending password to user.

According to some embodiments of the present invention an SMS source generates a personal message including a one time password, encrypts it with the Encryption broker using an encryption key, and sends the encrypted message to SMSC.

BRIEF DESCRIPTION OF THE DRAWINGS

FIG. 4 illustrates a block diagram, depicting the activity and configuration of a cellular network with an SMS security proxy, a security probe and a secured SIM according to some embodiments of the present invention.

DETAILED DESCRIPTION OF SOME EMBODIMENTS OF THE INVENTION

Figure 1:
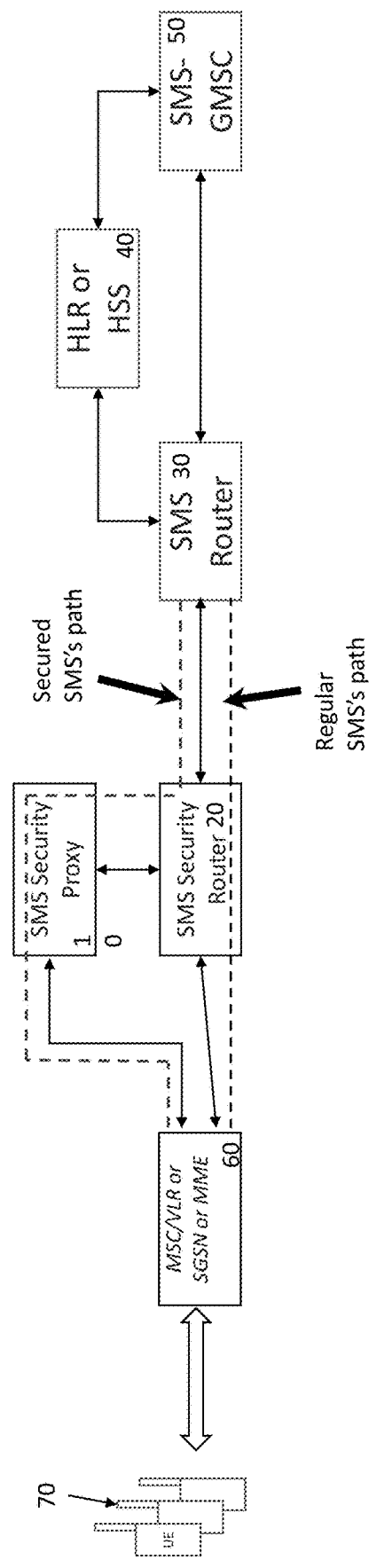
FIG. 1 illustrates a block diagram, depicting the activity and configuration of a cellular network with an SMS security proxy according to some embodiments of the present invention.

Before explaining at least one embodiment of the present invention in details, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The following table provides definitions of terms used throughout this application.

| Term | Definition |
| --- | --- |
| SMS Security Proxy | A communication server enabling to monitor and analyze text messages (SMS) |
| Security probe | For monitoring relevant signaling communication (e.g. HLR/HSS - VLR/SGSN communication) |
| SMS Security router | For identifying messages to be protected, based on information included in the message, e.g. source/sender address included in a list of addresses, organizations addresses, which are registered to the service. |
| SMS router | SMS-SC (SMS Service Center) like entity which is added in the HPLMN (Home Public Mobile Network) of the SMS receiving subscriber, all MT (Mobile Terminated) SMS are routed through this entity |
| Secured SIM | A sim card which enables decryption of received messages |
| subscriber serving node | MSC/VLR MME, or SGSN and SMS-GMSC |

| Term | Definition |
| --- | --- |
| SMS-GMSC | The SMS gateway MSC (SMS-GMSC) is an MSC capable of receiving a short message from an SMSC, interrogating a home location register (HLR) for routing information, and delivering the short message to the "visited" MSC of the recipient mobile station . . . The SMS-GMSC/SMS-IWMSC (InterWorking MSC) are typically integrated with the SMSC or SGSN |
| MSC/VLR | The Visitor Location Register (VLR) is a database in a mobile communications network associated to a Mobile Switching Centre (MSC). The VLR contains the exact location of all mobile subscribers currently present in the service area of the MSC. This information is necessary to route a call to the right base station. |
| MME | MME is the Mobility Management Entity. |
| HLR | The Home Location Register (HLR) is the main database of permanent subscriber information for a mobile network. The HLR is an integral component of CDMA (code division multiple access), TDMA (time division multiple access), and GSM (Global System for Mobile communications) networks. |
| HSS | The Home Subscriber Server (HSS) is a key element of LTE and IMS core networks; it is a master user database that is stored in one single node . . . The role of the HSS is to communicate with the network and provide subscriber profile and authentication information |
| SGGN (Serving GPRS Support Node) | The Serving GPRS Support Node (SGSN) is a main component of the GPRS network, which handles all packet switched data within the network, e.g. the mobility management and authentication of the users. The SGSN performs the same functions as the MSC for voice traffic. The SGSN and the MSC are often co-located. |

The present invention refers to the need of protection against malicious hijacking of messages sent to cellular users, containing highly important information, such as a one-time password (OTP) sent for enabling access to sensitive accounts (i.e., bank account, email account)—this process is also known as Two Factor Authentication (2FA).

The protection assures that a sensitive message is sent to an intended true user and is not hijacked by a malicious attacker which may manipulate the flow of the message in a cellular network.

FIG. 1 illustrates a block diagram, depicting the activity and configuration of a cellular network with an SMS security proxy according to some embodiments of the present invention.

The system according to the present invention provides a method for securing the transmission of electronic messages, such as text messages (SMSs). The system comprises:
- a Security Proxy 10 which handles incoming SMS communications to cellular mobile devices 70 through a subscriber serving node (e.g. MSC/VLR, MME or SGSN 60 and SMS-GMSC 50) through an SMS router 30 in association with HLR/HSS.
- The SMS security router 30 identifies messages to be protected based on the content of the message or by Identifying a source/sender address based on a list organizations addresses, registered to the service.
- The security proxy 10 monitors/probes text messages (SMSs) sent to the client and optionally validates the originality of the subscriber serving node e.g. the VLR originality MME originality etc, (not faked).

According to some embodiments of the present invention the Security router is configured to identify message based on sender address, wherein the security proxy handless only senders registered to the service.

According to some embodiments of the present invention the HSS/HLS and Security router are configured to identify and filter message based on destined recipient address wherein the security proxy handless only messages having destined recipient registered to the service.

Figure 2:
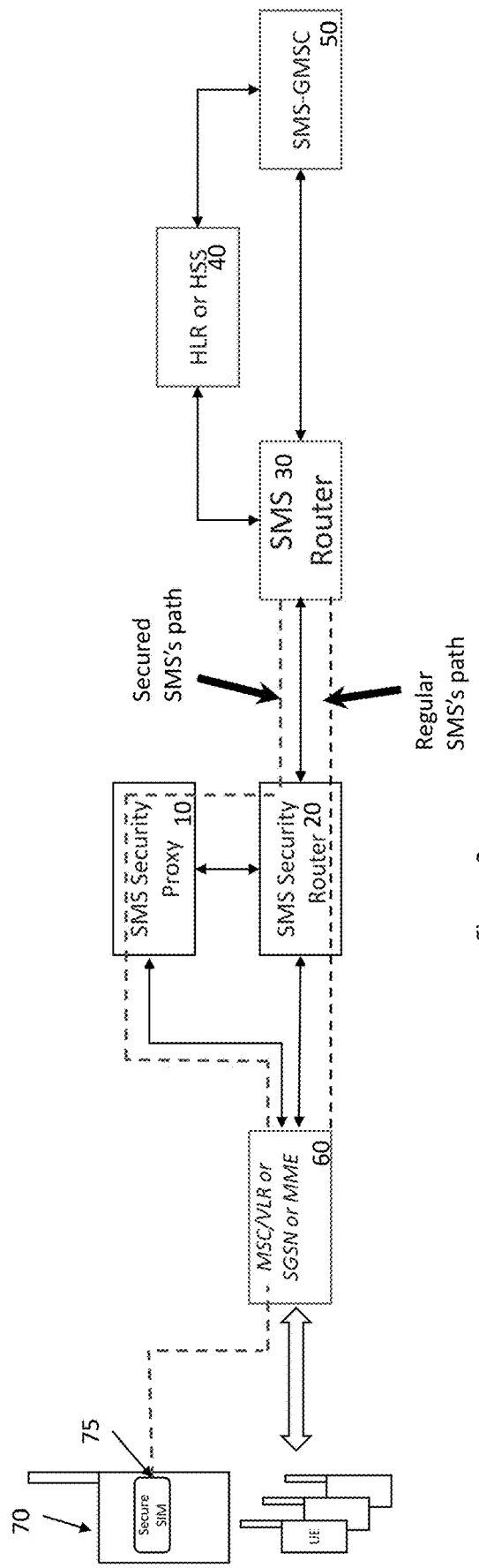
FIG. 2 illustrates a block diagram, depicting the activity and configuration of a cellular network with an SMS security proxy and a secured SIM according to some embodiments of the present invention.

FIG. 2 illustrates a block diagram, depicting the activity and configuration of a cellular network with an SMS security proxy and a secured SIM according to some embodiments of the present invention.

According to this embodiment the system includes a secured SIM 80 at the cellular device which enables authenticating and securing the message destination.

Figure 3:
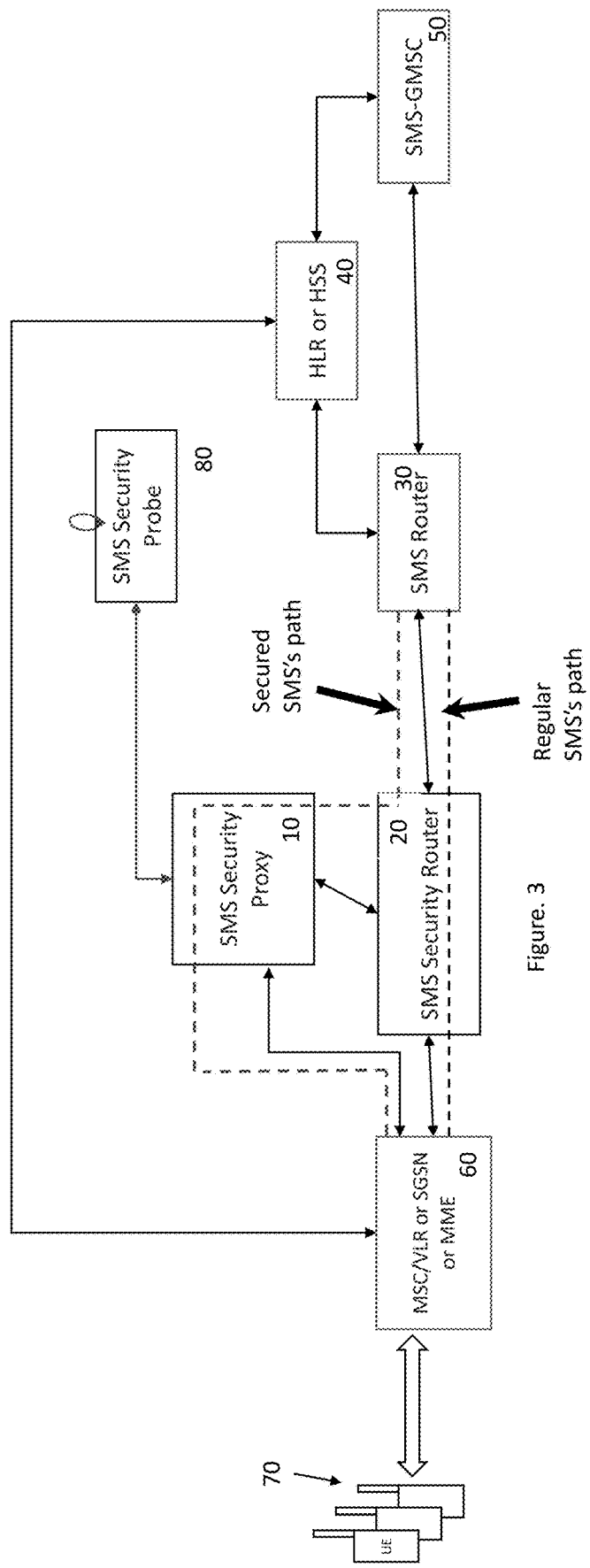
FIG. 3 illustrates a block diagram, depicting the activity and configuration of a cellular network with an SMS security proxy and a security probe according to some embodiments of the present invention.

FIG. 3 illustrates a block diagram, depicting the activity and configuration of a cellular network with an SMS security proxy and a security probe according to some embodiments of the present invention.

The security SMS proxy in collaboration with the security probe is configured to analyze parameters and characteristics of the monitored communication in real time or in relation to historically acquired data, including at least one of communication with subscriber serving node, subscriber serving node properties or the behavior of destination address/source address.

According to this embodiment, the system includes a security probe 80, enabling to monitor the subscriber serving node communication and detect suspicious scenarios.

FIG. 4 illustrates a block diagram, depicting the activity and configuration of a cellular network with an SMS security proxy, a security probe and a secured SIM according to some embodiments of the present invention.

According to this embodiment, the system includes a security probe 80 in combination with a secured SIM, enabling to monitor subscriber serving node communication, detect suspicious scenarios, and to authenticate the message destination.

Figures 5A, 5B:
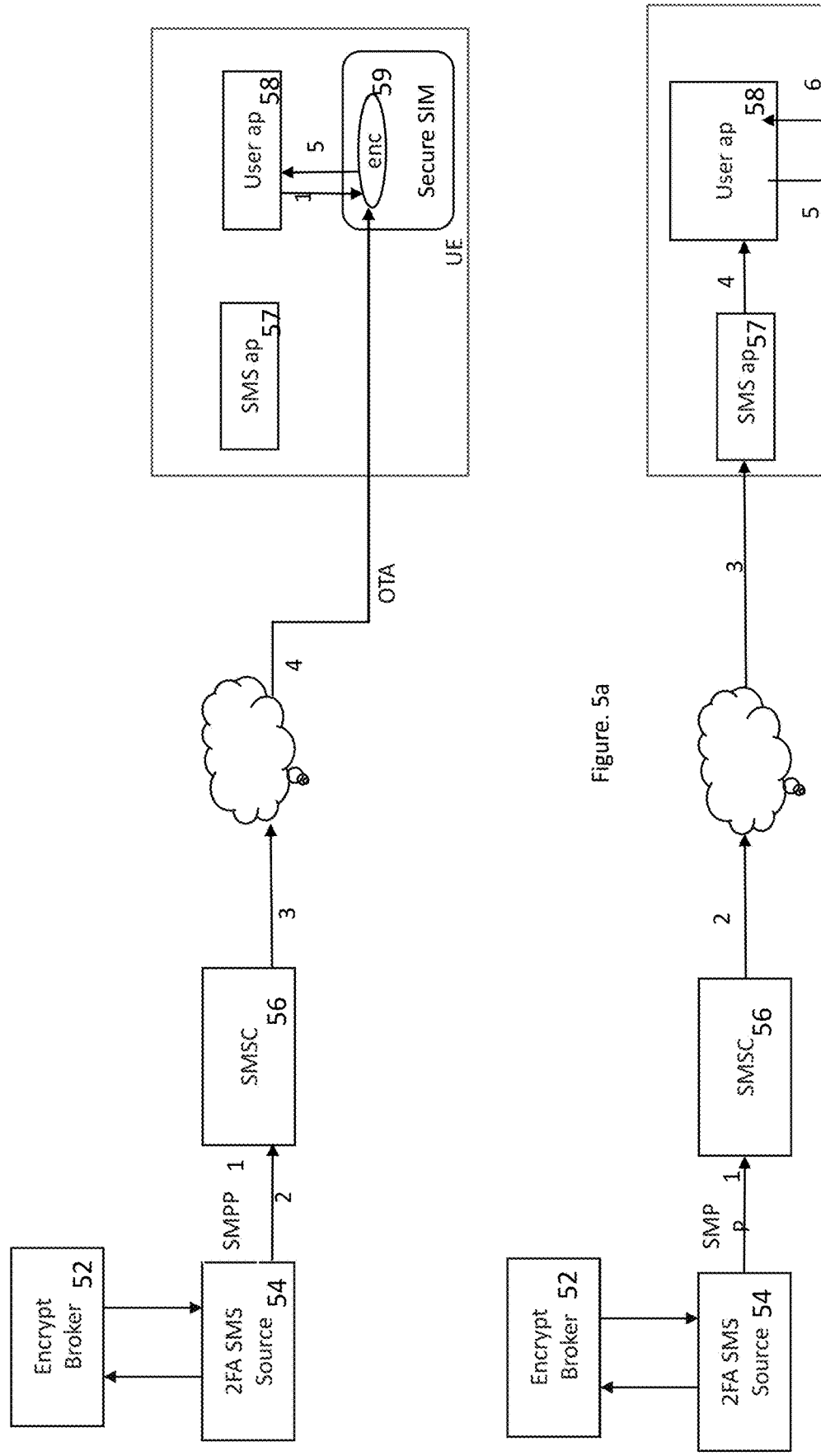
FIG. 5a illustrates a block diagram, depicting the activity and configuration of a cellular network with an encryption broker wherein a message is received directly at the secured SIM according to some embodiments of the present invention.
FIG. 5b illustrates a block diagram, depicting the activity and configuration of a cellular network with an encryption broker wherein a message is received via a dedicated user application according to some embodiments of the present invention.

FIG. 5a illustrates a block diagram, depicting the activity and configuration of a cellular network with a secured SIM 59 and an encryption broker 52 wherein the message is received directly at the secured SIM according to some embodiments of the present invention.

According to this embodiment the following process is implemented in the following process: User application requests password from encryption app on the secure SIM 58 (1), 2FA source generates personal message such onetime password, encrypt it with the Encryption broker (the encryption is personalized to the recipient), and sends to SMSC (2), the SMSC forward the message as OTA message through the network (3), the message is forwarded thorough the network to the mobile device directly to the encryption app (4) on the secure SIM, the message is returned to the user app after decryption (5).

FIG. 5b illustrates a block diagram, depicting the activity and configuration of a cellular network with a secured SIM and an encryption broker wherein the message is received at dedicated user application according to some embodiments of the present invention.

The 2FA SMS Source 54 generates a message and encrypt it by the Encrypt Broker 54 and transmits the encrypted message through the SMSC 56 to user application 58 through the SMS app 57. The user application encrypts the message using the secure SIM 59.

According to this embodiment the following process is implemented in the following process: Simple SMS sent to user ap (via SMS ap): The 2FA source 54 generates the message such as one-time password, encrypts it with the Encryption broker 52 (the encryption is personalized to the recipient), and sends it to the SMSC 56 (1), the SMSC forwards the message through the network (2) to SMS App 57 on the device (3), the SMS with the encrypted password is forwarded to the user application 58 (4), user encryption is sent to the secure SIM (59) (5) and the message is decrypted on the SIM app and returned to user application (6).

Figure 5C:
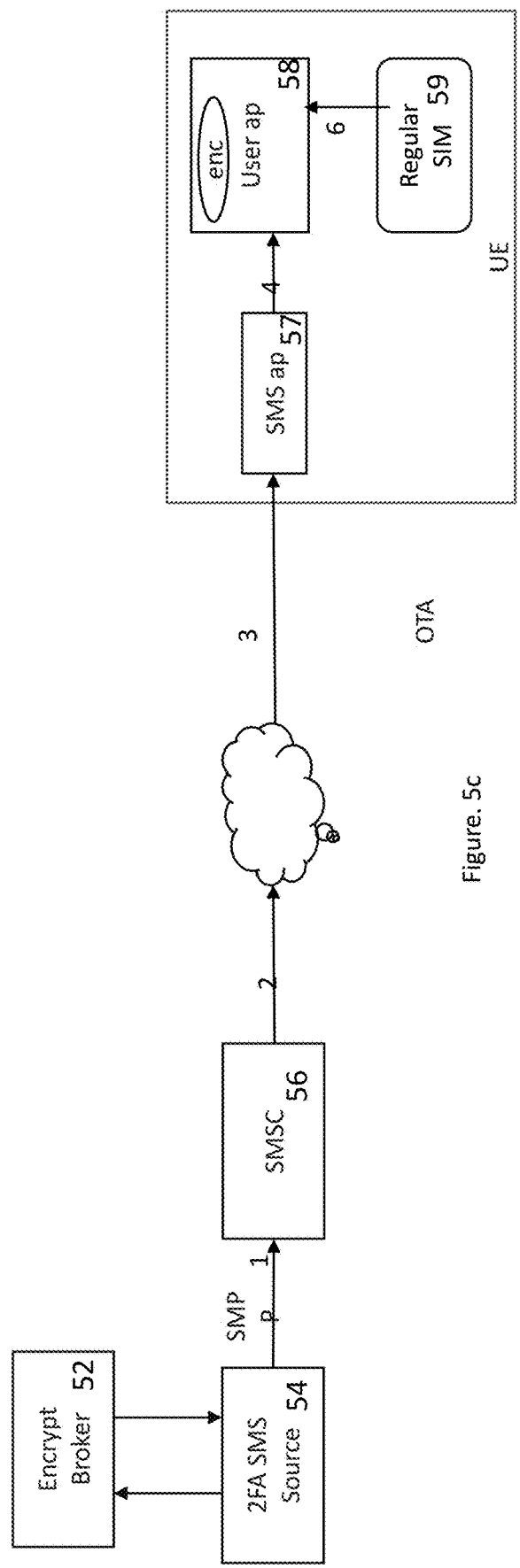
FIG. 5c illustrates a block diagram, depicting the activity and configuration of a cellular network with an encryption broker using an encryption key, wherein the message decryption is performed via a user dedicated application, according to some embodiments of the present invention.

FIG. 5c illustrates a block diagram, depicting the activity and configuration of a cellular network with an encryption broker where the decryption is performed via a user dedicated application according to some embodiments of the present invention.

The 2FA SMS Source 54 generates a message and encrypt it by the Encrypt Broker 54 and transmits the encrypted message through the SMSC 56 to user application 58 through the SMS app 57. The user application encrypts the message by receiving decryption key form the secure SIM. According to this embodiment with No secure SIM the following process is implemented in the following process: Similar to flow of FIG. 5b, with the following differences: Decryption is performed on the user app, not on the SIM, SIM is used only for storing the decryption key and Stages 5 and 6 vin the flow are performed by the user app for getting the key form the SIM.

Figure 6:
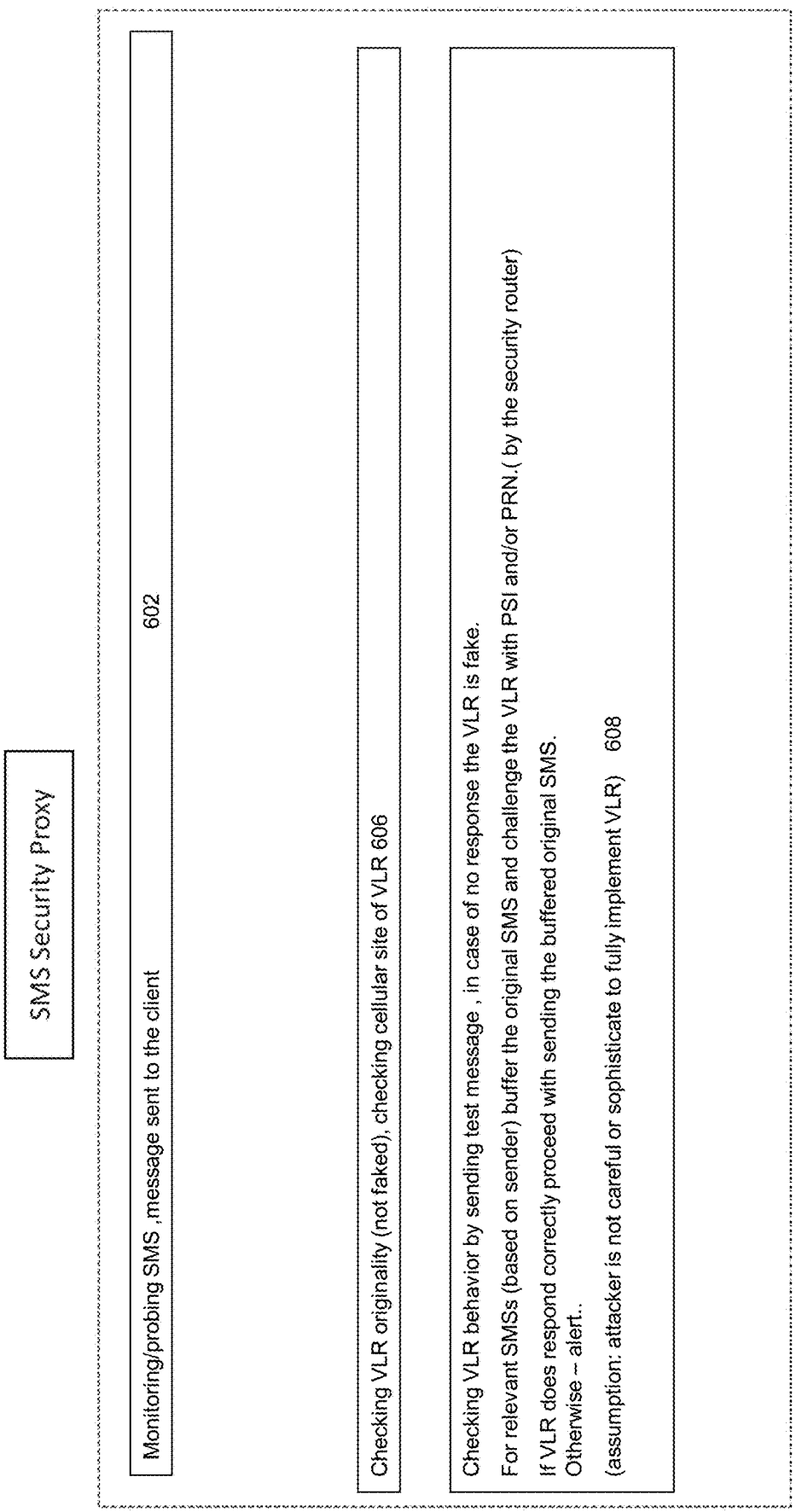
FIG. 6 is a flow diagram, depicting the actions of the SMS security proxy, according to some embodiments of the present invention.

FIG. 6 is a flow diagram, depicting the actions of the SMS security proxy, according to some embodiments of the present invention.

The SMS security proxy implements at least one of the following steps:
- Monitoring/probing and buffering a text message (SMS) sent to the client; (602)
- Checking the subscriber serving node originality for identifying fake message destinations by checking the cellular site of the subscriber serving node; (606)

According to some embodiments of the present invention, the authenticity of the destination subscriber serving node is challenged by sending a challenge signaling message which requires response, by the SMS security proxy, wherein if the subscriber serving node does respond correctly, proceeding with sending the buffered original text messages, otherwise, blocking the messages.

Optionally, according to some embodiments of the present invention, checking the subscriber serving node behavior by sending a test message. In case of no response or no proper reply (not expected, or incorrect optionally based on known response), the subscriber serving node is assumed to be fake (608).

Filtering relevant text messages (SMSs) based on the information in each of the messages, for example Identifying a source/sender address based on a list of organizations addresses, which are registered to the service, (other text messages are routed directly to their destination).

The relevant identified text messages are buffered and challenge the subscriber serving node with a signaling response request, such as PSI (Provide Subscriber Information) and/or PRN (Provide Roaming Number) by the SMS security proxy.

If the subscriber serving node does respond correctly, proceeding with sending the buffered original text messages. Otherwise, blocking the messages and optionally generating and sending an alert.

This solution is based on the assumption that the attacker is not careful or sophisticate to fully implement the subscriber serving node site.

Figure 7:
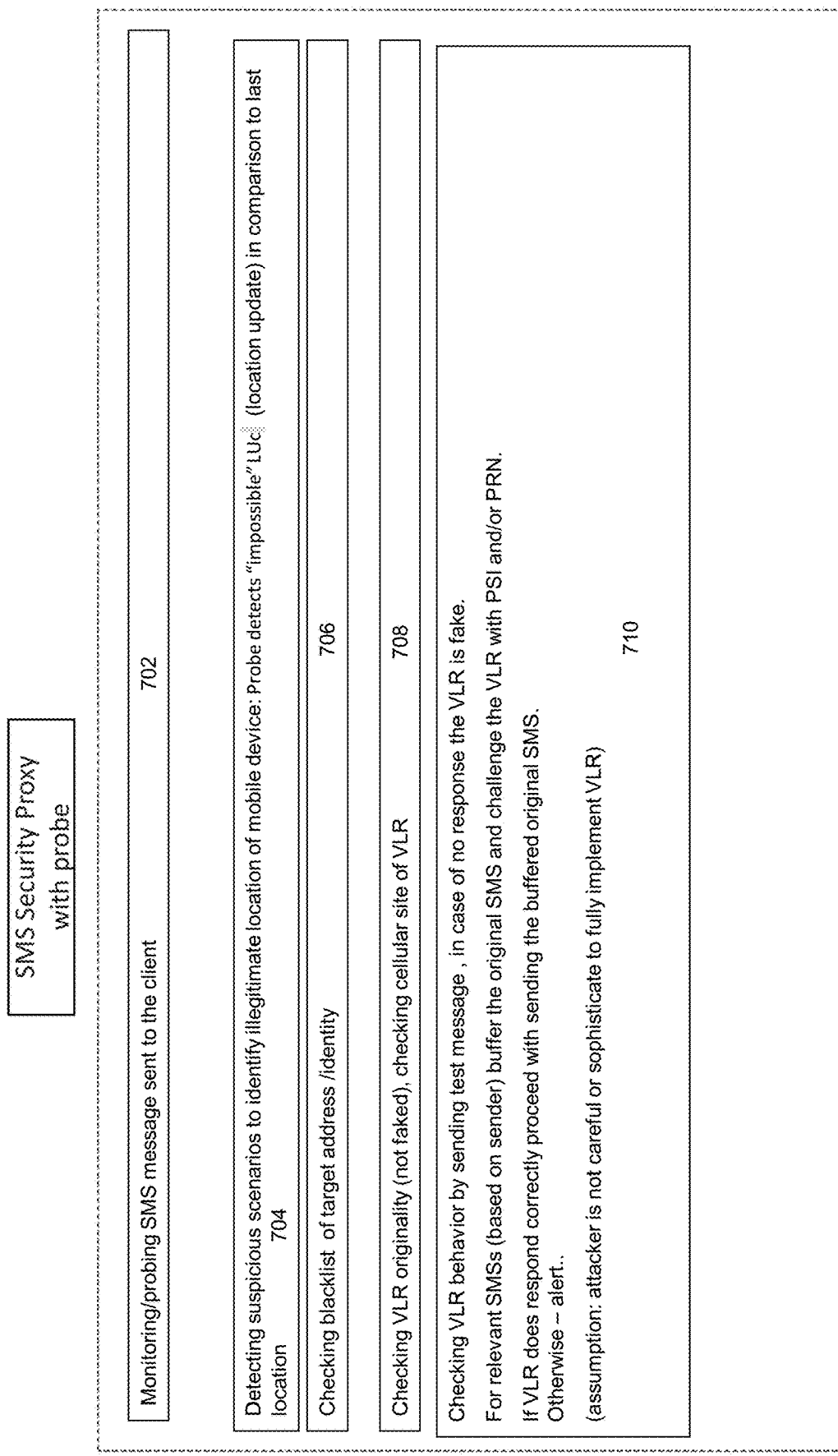
FIG. 7 is a flow diagram, depicting the actions of the SMS security proxy with a security probe, according to some embodiments of the present invention.

FIG. 7 is a flow diagram, depicting the actions of an SMS security proxy with a security probe, according to some embodiments of the present invention.

The SMS security proxy implements at least one of the following steps:
- detecting suspicious scenarios to identify an illegitimate location of a mobile device: the probe detects illogical LU (location update) (702);
- monitoring/probing a text message sent to the client (704);
- checking a blacklist of destination addresses/identity (706);
- Checking the subscriber serving node originality and identifying fake sites by checking the cellular site of the subscriber serving node (708);
- Optionally checking the subscriber serving node behavior by sending a test message. In case of no response or incorrect response, the subscriber serving node is fake or improper/incorrect.
- Filtering relevant text messages (by identifying messages to be protected based on the content of the messages e.g., by Identifying a source/sender address based on a list of addresses, organizations addresses, which are registered to the service).
- Buffering the original text messages and optionally challenging the subscriber serving node with a challenge signaling message (which requires response), such as PSI and/or PRN (by the security router).
- If the subscriber serving node does respond correctly, proceeding with sending the buffered original text message. Otherwise, blocking the message and optionally generating and sending an alert.

Figure 8:
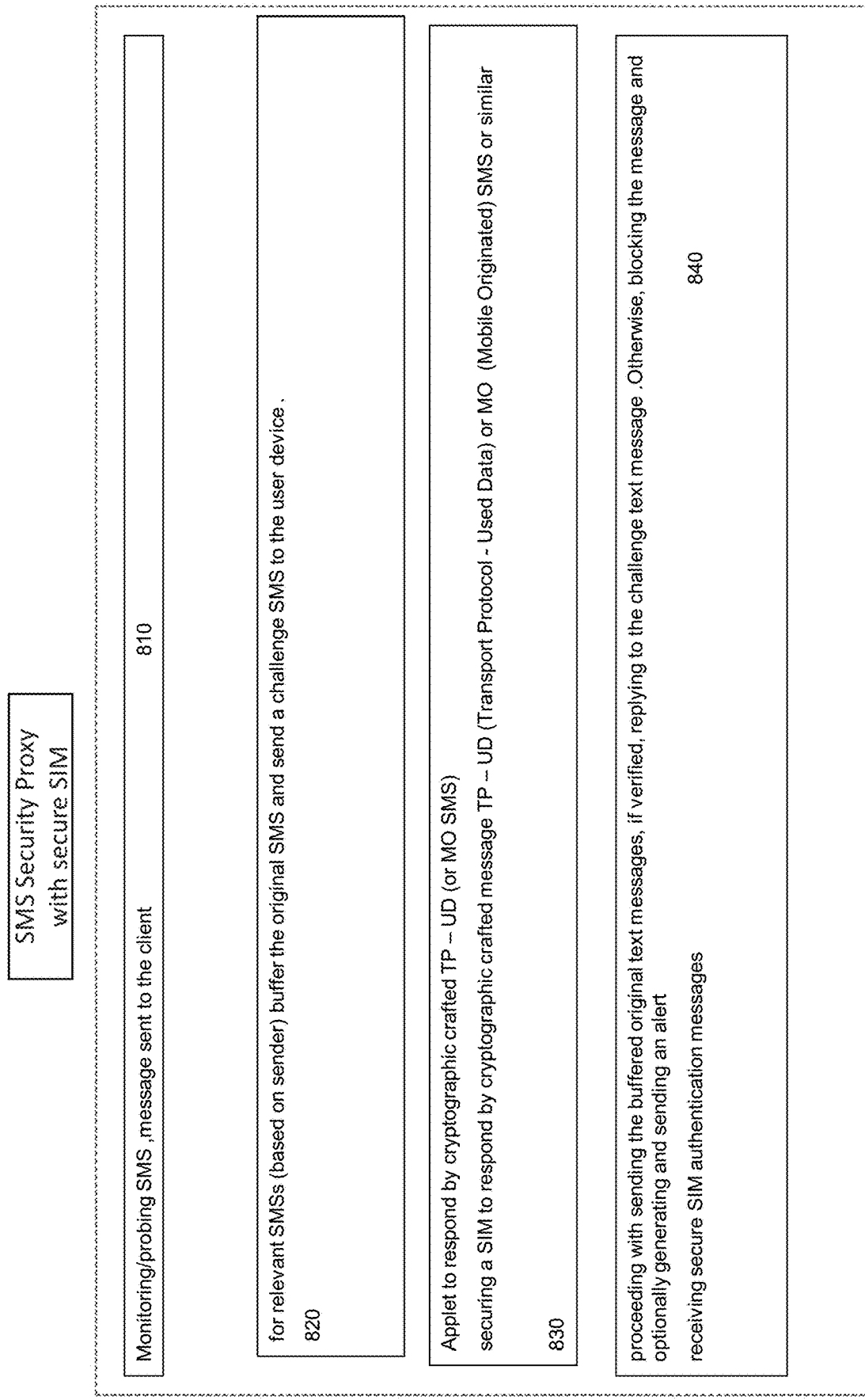
FIG. 8 is a flow diagram, depicting the actions of the SMS security proxy with a secured SIM, according to some embodiments of the present invention.

FIG. 8 is a flow diagram, depicting the actions of the SMS security proxy with a secured SIM, according to some embodiments of the present invention.

The SMS security proxy implements at least one of the following steps:
- monitoring/probing text messages sent to the client (810);
- filtering relevant text messages by identifying messages to be protected based on the content or metadata of the messages, e.g., by identifying a source/sender address based on a list of addresses, organizations addresses, which are registered to the service).
- For relevant message buffering the original text messages and sending a challenge message to the cellular device of the user (820).
- securing a SIM to respond by cryptographic crafted message TP-UD (Transport Protocol—Used Data) or MO (Mobile Originated) SMS or similar (830);
- proceeding with sending the buffered original text messages, if verified, replying to the challenge message. Otherwise, blocking the message and optionally generating and sending an alert (840).

Figure 9:
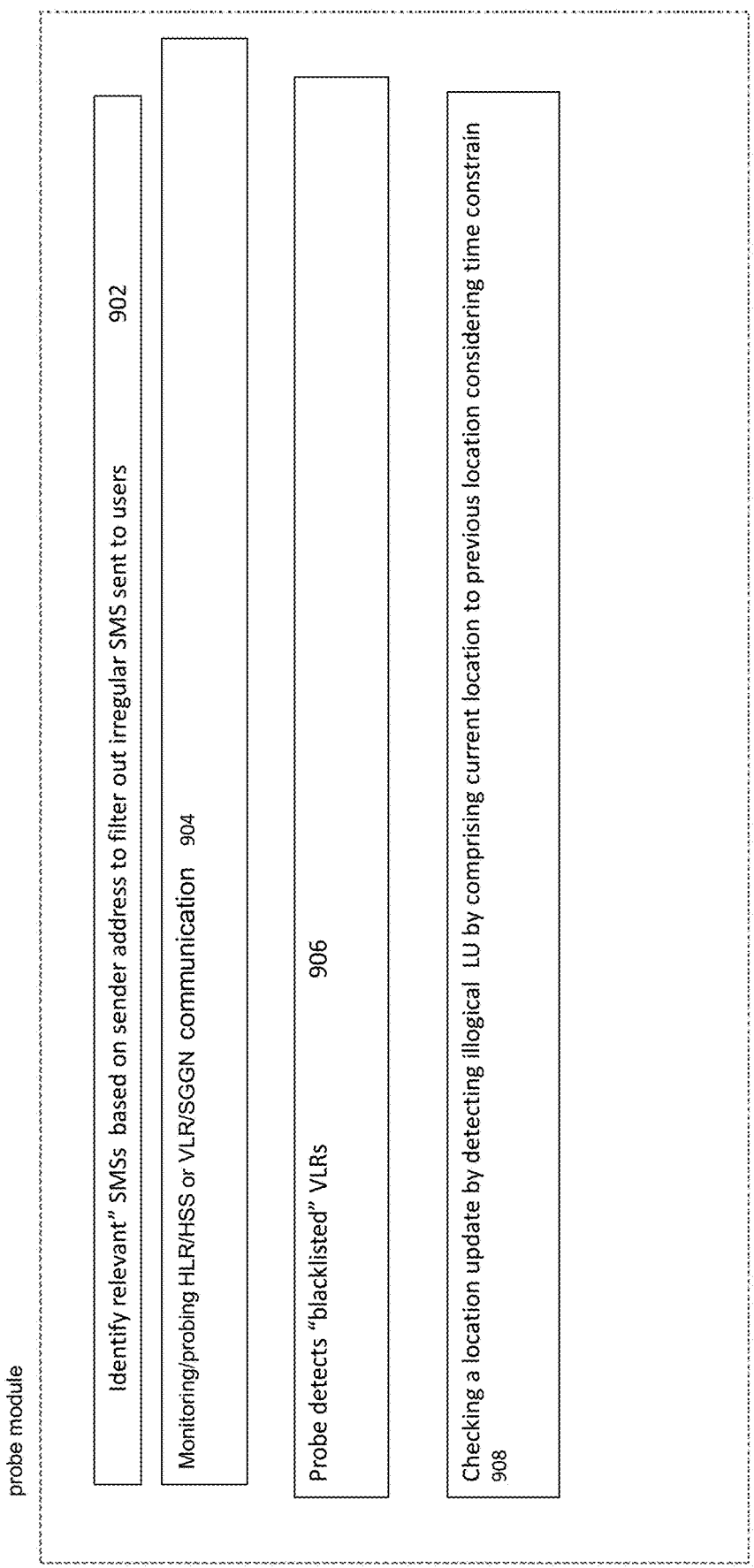
FIG. 9 is a flow diagram, depicting the actions of the security probe, according to some embodiments of the present invention.

FIG. 9 is a flow diagram, depicting the actions of the security probe, according to some embodiments of the present invention.

Figure 10A:
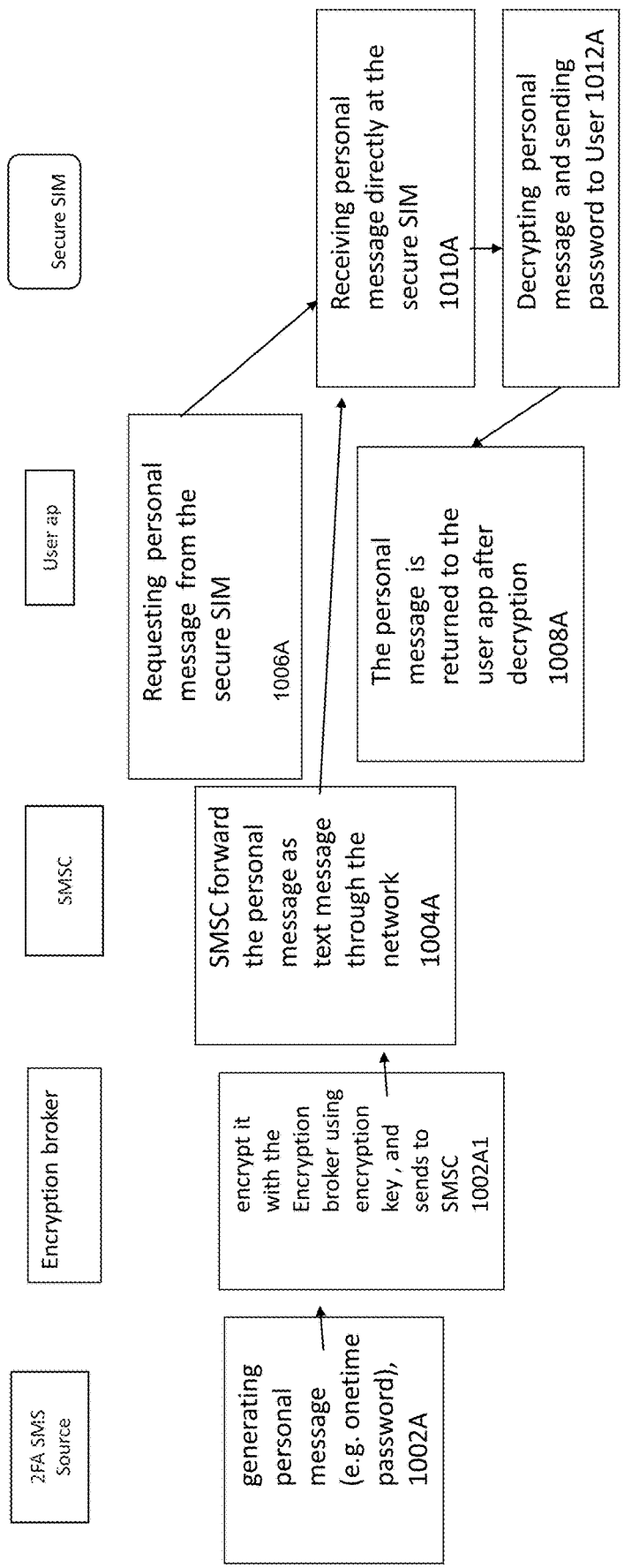
FIG. 10A is a flow diagram, depicting the actions using an encryption broker with an encryption key wherein the message is received directly at the secured SIM, according to some embodiments of the present invention.

The security probe implements at least one of the following steps:
- Optionally identify relevant SMSs based on sender address or based on content (902):
- monitoring/probing subscriber serving node communication (904);
- probing detects "blacklisted" of subscriber serving node (906); and
- Checking a location update by detecting illogical LU by comparing current location to previous location considering time constrain (908);

FIG. 10A is a flow diagram, depicting the actions using an encryption broker with an encryption key wherein the message is received directly at the secured SIM, according to some embodiments of the present invention.

At the stage of configuring the secured SIM, an encryption key is created and loaded on the secured SIM.

Figure 10B:
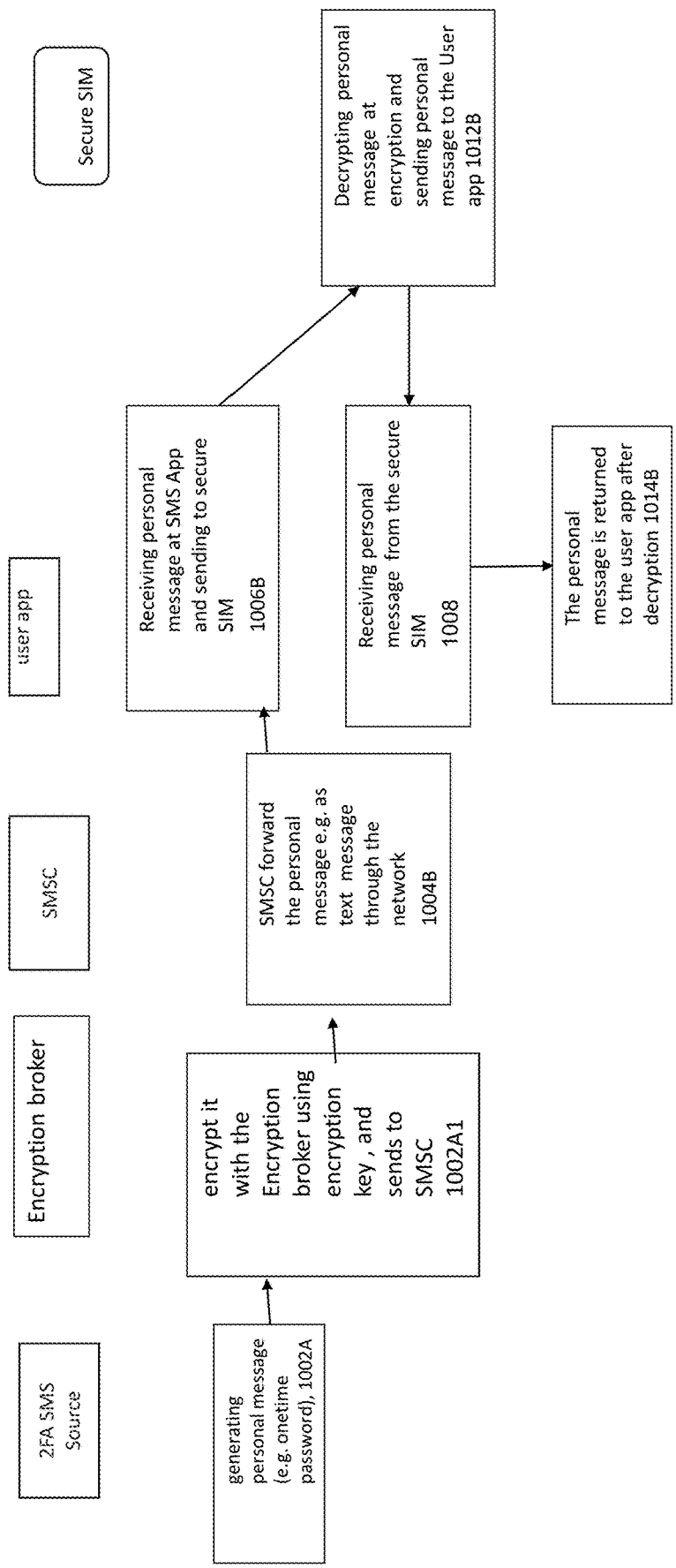
FIG. 10B is a flow diagram, depicting the actions using an encryption broker with an encryption key wherein the message is received via a user dedicated application, according to some embodiments of the present invention.

The scenario of working with the encryption broker implements at least one of the following steps:
- the SMS source generates a personal message such as a one time password, encrypts it with the Encryption broker using an encryption key (the encryption is personalized to the recipient), and sends the encrypted message to SMSC (1002A);
- the SMSC forwards the personal message, e.g., as a text message (SMS) through the network to the user device (1004A);
- the personal message is received directly at the decryption app on the secure SIM (1008A);
- The personal message (one time password) is decrypted via the decryption module at the secured SIM and a decrypted personal message is sent to User app (1010A);
- The personal message (one time password) is returned to the user app after decryption (1020);

FIG. 10B is a flow diagram, depicting the actions using an encryption broker with an encryption key, one password, wherein the message is received via the user dedicated application, according to some embodiments of the present invention.

Figure 10C:
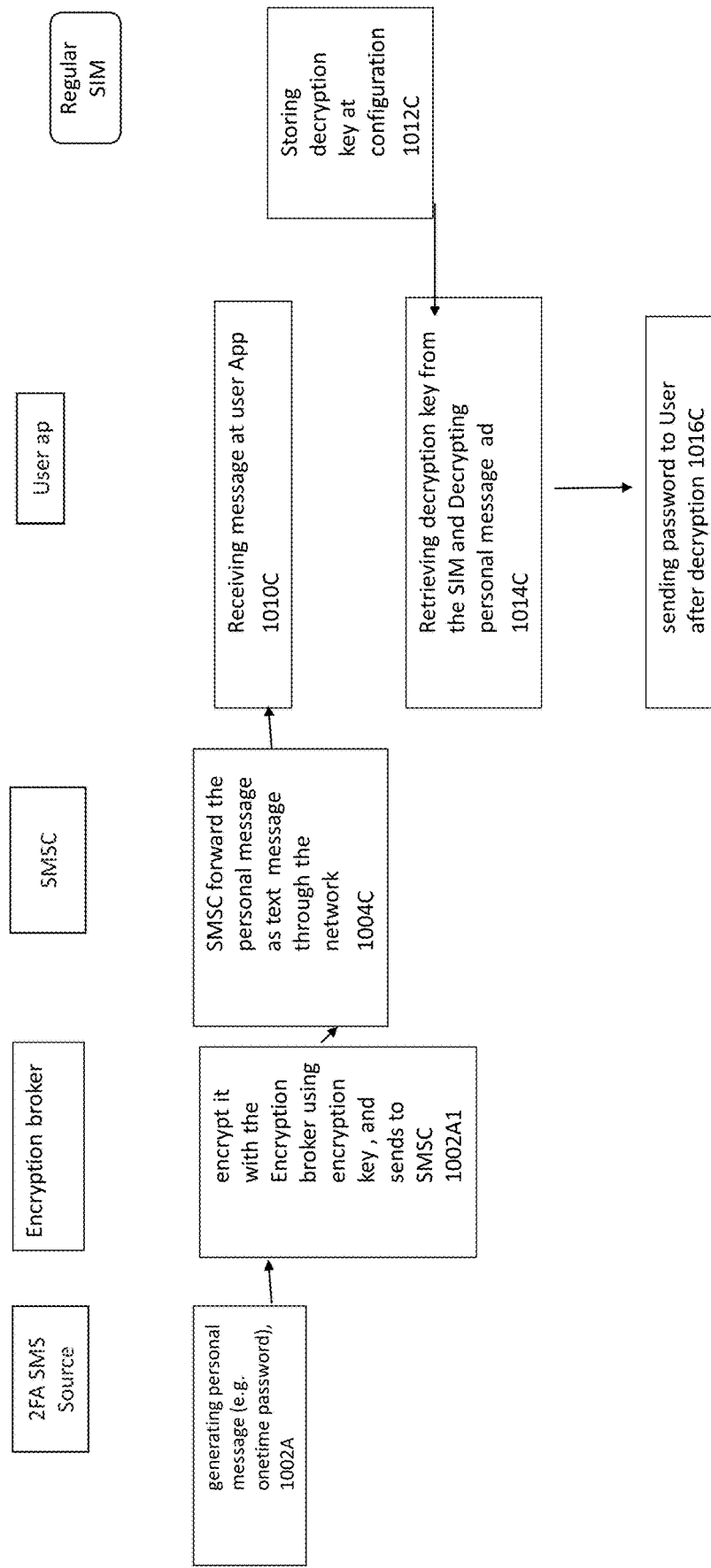
FIG. 10C is a flow diagram, depicting the actions using an encryption broker with an encryption key wherein the message decryption is performed via a user dedicated application, according to some embodiments of the present invention.

The scenario of working with the encryption broker implements at least one of the following steps:
- generating a personal message to be sent to the client, such as, a one time password, encrypting it with the encryption broker with an encryption key (the encryption is personalized to the recipient), and sending it to SMSC (1002B);
- SMSC forwarding the personal message. e.g., a text message through the network (1004B);
- receiving a personal message via the SMS App and sending it to a secured SIM (1006B);
- decrypting a personal message via an encryption app at the secured SIM and sending the decrypted personal message to a user app (1012B);
- returning the decrypted personal message (e.g., a one-time password) to the user app after decryption (1014B);

FIG. 10C is a flow diagram, depicting the actions using the encryption broker with a one-time password, wherein the decryption is performed via the user dedicated application, according to some embodiments of the present invention.

The scenario of working with the encryption broker implements at least one of the following steps:
  a. the SMS source generates a personal message such as one-time password, encrypts it with the encryption broker with an encryption key, and sends it to SMSC (1002C);
  b. the SMSC forwards the personal message. e.g., the text message through the network (1004C);
  c. the personal message is received via an SMS application;
  requesting an encryption key from the encryption app on the secured SIM (the decryption key is stored at the SIM): (1008C), and
  retrieving the decryption key from the SIM, decrypting the personal message and sending the decrypted personal message to the user (1012C).

Figure 11:
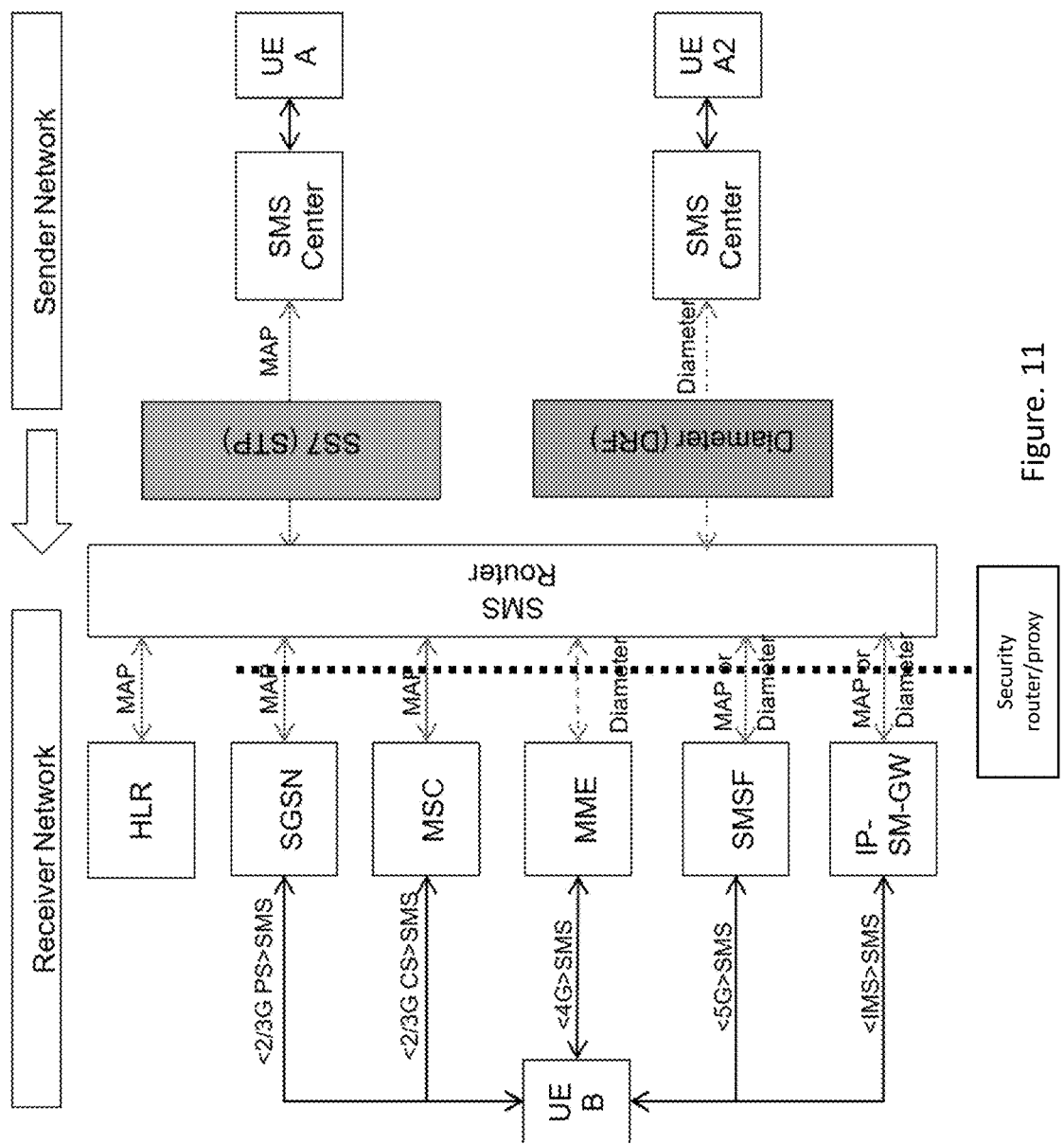
FIG. 11 illustrates a block diagram, depicting the configuration of a cellular network with an SMS security proxy according to some embodiments of the present invention.

FIG. 11 illustrates a block diagram, depicting the configuration of a cellular network with SMS security proxy according to some embodiments of the present invention. This figure provides a general overview of the SMS security proxy of the present invention when integrated with a variety of configurations of cellular networks, thus, enabling to monitor and/or to test communication between the sender network of a text message (SMS) and the recipient network.

The different embodiments seen in FIGS. 1-5 provide specific configurations of different solutions The present invention provides a system for securing transmission of electronic messages.

The system comprises:
  at least one non-transitory computer readable storage device and at least one processor operatively coupled to the storage device. The at least one processor includes modules of instruction codes, which when executed by the at least one processor, implement messages Security Proxy and message security (SMS) router for identifying message based on sender address;

The Security Proxy checks and buffers communication to cellular mobile devices through subscriber serving node (MSC/VLR MME or SGSN and SMS-GMSC) through a message router, using HLR or HSS service.

The Security Proxy is configured to buffer the messages and verify authenticity of the Message recipient, optionally challenge the subscriber serving node site.

When a destination is authenticated, the Security Proxy sends messages, otherwise, it blocks messages and optionally sends an alert to the user.

Two protection methods are suggested in accordance with some embodiments of the present invention.

The first method comprises the following stages:
  a. adding to the cellular network an element capable of recognizing in real time messages which are to be protected (based on a sender address). The messages to be protected are routed to a dedicated security proxy, while all other messages are routed as usual, with no change.
  b. buffering the protected messages via the security proxy, authenticating the assumed destination of the messages (using several novel flows, described below), and only if the assumed destination is assured, proceeding with forwarding the message to the destination.

The second method comprises the following stages:
  a. including a dedicated decryption key in the device of the intended user.
  b. prior to sending the message to the intended user, an encryption broker, equipped with the relevant keys, encrypting the one-time password provided by the creator of the password.

The system of the present invention may include, according to certain embodiments of the invention, machine-readable memory containing or otherwise storing a program of instructions which, when executed by the machine, implements some or all of the apparatus, methods, features, and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading". "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field-programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read-only memory) form including CD-ROMs. EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein, and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A system for assuring that a cellular electronic message is sent to an intended true user, said system comprising:
   at least one non-transitory computer readable storage device and one or more processors operatively coupled to the storage device on which are stored modules of instruction code which when executed by said one or more processors implements by messages Security Proxy;
   wherein said messages Security Proxy monitors in real time communication to cellular mobile devices through subscriber serving node;
   wherein said Security Proxy is configured to buffer the messages and verify authenticity of the message recipient in real time, authenticating a destination of the messages;
   in case the message recipient and the destination of the messages is authenticated, proceeding with forwarding the message to the destination, otherwise block the message;
   wherein the recipient is authenticated in real time by checking subscriber serving node behavior by sending a test message, wherein in case of no response or incorrect response the subscriber serving node is identified as fake.

2. The system of claim 1 further comprising a SMS Security Router, for creating secured message path between the message router and the subscriber serving node.

3. The system of claim 2 wherein the Security router is configured to identify message based on sender address, wherein the security proxy handles only senders registered to the service.

4. A system for assuring that a cellular electronic message is sent to an intended true user, said system comprising:
   at least one non-transitory computer readable storage device and one or more processors operatively coupled to the storage device on which are stored modules of instruction code which when executed by said one or more processors implements by messages Security Proxy; and
   a security probe configured to analyze parameters and characteristics of a monitored HLR/HSS or VLR/SGGN or MME communication in real time or in relation to historically acquired data, including at least one of communication with subscriber serving node, subscriber serving node properties or the behavior of destination address or source address;
   wherein said messages Security Proxy monitors in real time communication to cellular mobile devices through subscriber serving node;
   in case a message recipient and destination of the message is authenticated, proceeding with forwarding the message to the destination, otherwise block the message;
   in case the message recipient is authenticated, send the message, otherwise block the message.

5. The system of claim 4 wherein the security probe is configured to detect suspicious scenarios to identify illegitimate location of a mobile device by detecting location update which is inconsistent with timing of previous location.

6. The system of claim 4 wherein the security probe is configured to check a blacklist of subscriber serving node destination addresses/identity.

7. The system of claim 4 wherein the security SMS proxy in collaboration with the security probe is configured to analyze parameters and characteristics of the monitored communication in real time or in relation to historically acquired data, including at least one of communication with subscriber serving node, subscriber serving node properties or the behavior of destination address/source address.

8. A system for assuring that a cellular electronic message is sent to an intended true user, said system comprising:
- at least one non-transitory computer readable storage device and one or more processors operatively coupled to the storage device on which are stored modules of instruction code which when executed by said one or more processors implements by messages Security Proxy;
- wherein said messages Security Proxy monitors in real time communication to cellular mobile devices through subscriber serving node;
- wherein said Security Proxy is configured to buffer the messages and verify authenticity of the Message recipient in real time, authenticating a destination of the messages;
- in case the message recipient and destination of the message is authenticated, proceeding with forwarding the message to the destination, otherwise block the message; and
- a secure SIM enabling a response to a cryptographic challenge message, wherein authentication is verified by sending the cryptographic challenge message to one of the cellular mobile devices, and wherein replying to the cryptographic challenge message is enabled by the secure SIM.

9. The system of 8 wherein the secure SIM is configured to receive a personal message directly at the secure SIM and to decrypt the message and send the personal message to user.

* * * * *